US008417704B2

(12) United States Patent
Rappold, III

(10) Patent No.: US 8,417,704 B2
(45) Date of Patent: Apr. 9, 2013

(54) EXTENSIBLE AGENT SYSTEM AND METHOD

(75) Inventor: Robert J. Rappold, III, Richmond, VA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2426 days.

(21) Appl. No.: 10/657,916

(22) Filed: Sep. 9, 2003

(65) Prior Publication Data

US 2005/0055449 A1 Mar. 10, 2005

(51) Int. Cl.
*G06F 17/30* (2006.01)
*G06F 7/00* (2006.01)
(52) U.S. Cl. .................................................. 707/737
(58) Field of Classification Search ........... 707/3, 104.1; 709/228
See application file for complete search history.

(56) References Cited

U.S. PATENT DOCUMENTS

| | | | | |
|---|---|---|---|---|
| 6,279,030 B1* | 8/2001 | Britton et al. | ................. | 709/203 |
| 6,330,710 B1* | 12/2001 | O'Neil et al. | ................. | 717/100 |
| 7,373,350 B1* | 5/2008 | Arone et al. | ................. | 707/100 |
| 2002/0129175 A1* | 9/2002 | Banavar et al. | ................. | 709/310 |
| 2003/0060214 A1* | 3/2003 | Hendrey et al. | ................. | 455/456 |
| 2003/0191812 A1* | 10/2003 | Agarwalla et al. | ............. | 709/217 |
| 2004/0215604 A1* | 10/2004 | Ivanov | .............................. | 707/3 |

FOREIGN PATENT DOCUMENTS

| | | |
|---|---|---|
| DE | 101 51 750 A1 | 5/2003 |
| EP | 1 190 304 B1 | 5/2000 |

OTHER PUBLICATIONS

Deugo, et al, "*Reusable Patterns for Agent Coordination*", published as Chapter 14 of "*Coordination of Internet Agents: Models, Technologies, and Applications*" (Omicini, et al. eds.), Springer, ISBN 3-540-41613-7, cover, VIRSO, and pp. 347-368, 2001.
Grand, Mark, "*Patterns in Java™, vol. 1: A Catalog of Reusable Design Patterns Illustrated with UML*", Wiley Computer Publishing, ISBN 0-471-25839-3, cover and VIRSO (2 pages), 1998.
Alur, et al., "*core J2EE™ Patterns: Best Practices and Design Strategies*", Prentice Hall PTR, Sun Microsystems Press, a Prentice Hall Title, ISBN 0-13-064884-1, cover and VIRSO (2 pages), 2001.
Gamma, et al., "*Design Patterns: Elements of Reusable Object-Oriented Software*", Addison-Wesley, ISBN 0-201-63361-2, cover and VIRSO (2 pages), 1995.
Larman, Craig, "*Applying UML and Patterns: An Introduction to Object-Oriented Analysis and Design*", Prentice Hall PTR, ISBN 0-13-748880-7, cover and VIRSO (2 pages), 1998.
Buschmann, et al., "*Pattern-Oriented Software Architecture: A System of Patterns*", John Wiley & Sons, ISBN 0 471 95869 7, cover and VIRSO (2 pages), 1996.
Chin-Wan Chung, "Design and Implementation of a Heterogeneous Distributed Database Management System," Proceedings of the Annual Joint Conference of the Computer and Communications Societies, XP-000075843, pp. 356-361, Apr. 23, 1989.
D. Duchier, L. Kornstaedt, C. Schulte, and G. Smolka, "A Higher-order Module Discipline with Separate Compilation, Dynamic Linking, and Pickling," Internet publication, XP-002283873, pp. 1-13, Sep. 29, 1998.

* cited by examiner

*Primary Examiner* — Usmaan Saeed
*Assistant Examiner* — Dung K Chau

(57) ABSTRACT

A method for providing an extensible agent comprises receiving a request from a client. One or more environment characteristics is then determined. At least a portion of a plurality of agent components are dynamically selected based on the client request and the environment characteristics. The client request is processed using the selected agent components.

39 Claims, 5 Drawing Sheets

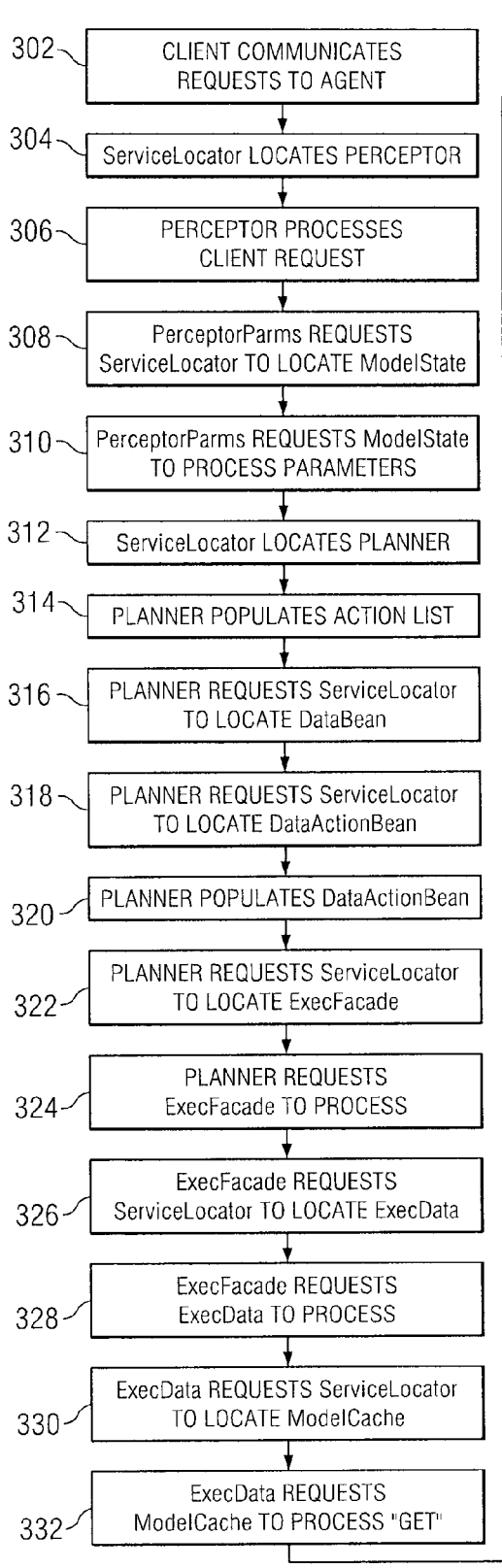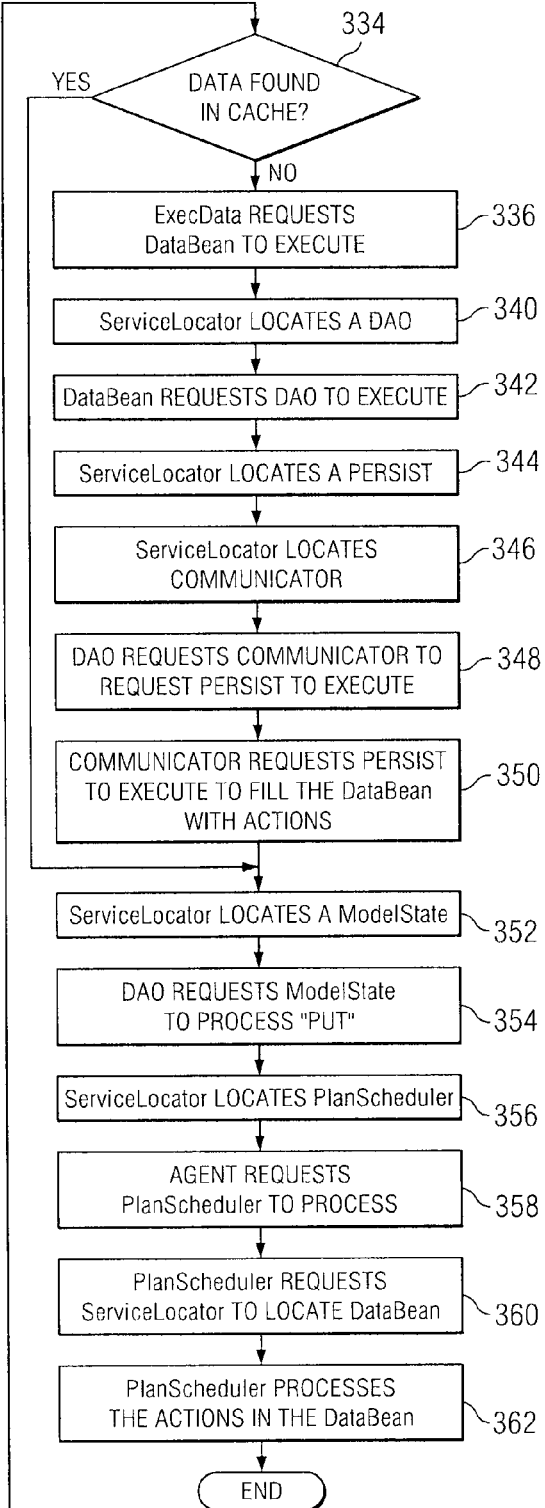
FIG. 3

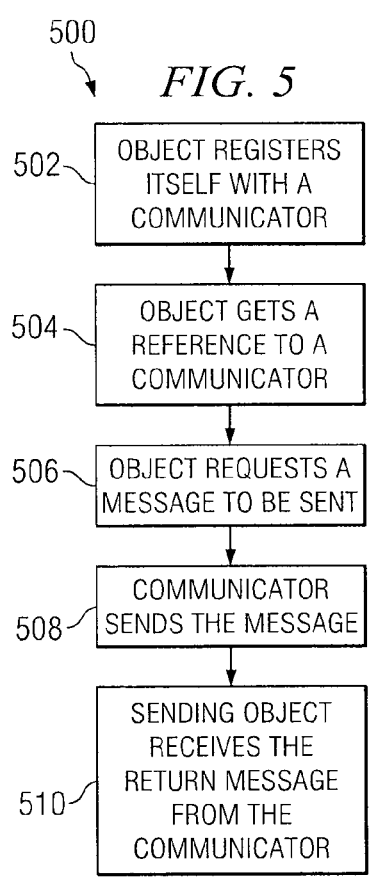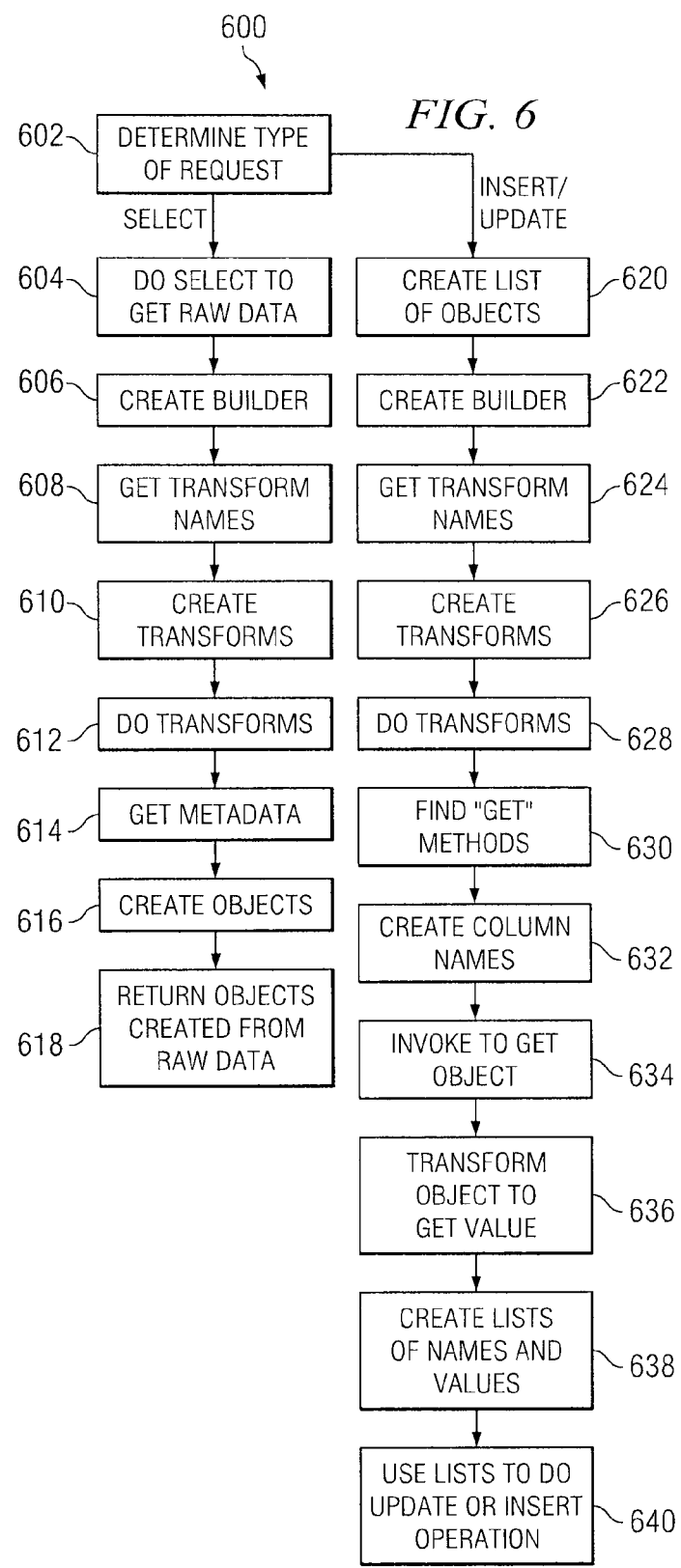

EXTENSIBLE AGENT SYSTEM AND METHOD

TECHNICAL FIELD OF THE INVENTION

This invention relates generally to the field of data processing and more particularly to an extensible agent system and method.

BACKGROUND OF THE INVENTION

Conventional software agents are software modules that reside on remote servers and autonomously process requests received from a client or another software component. At a high level, agents perform information gathering or processing tasks in the background and are defined to execute relatively small and well-defined tasks. Each agent is typically customized for a specific environment in order to attempt to satisfy the particular set of goals or tasks. For example, one agent may be designed to operate in a web-enabled environment, but the agent may be unable to operable to a non-web-enabled environment. In another example, a first agent may be operable to retrieve data from only one type of relational database, thereby requiring a second agent to access a second type of relational database. These agents often require changes by a programmer in order to manage a different environment or diverse outputs, components, products, or business logic.

SUMMARY OF THE INVENTION

One aspect of the invention is a method for providing an extensible agent that comprises receiving a request from a client. One or more environment characteristics is then determined. At least a portion of a plurality of agent components are dynamically selected based on the client request and the environment characteristics. The client request is processed using the selected agent components.

In another embodiment of the present invention, a server comprises a memory operable to store a database and a knowledgebase, the knowledgebase comprising a plurality of component selection patterns. The server further includes one or more processors collectively operable to receive a request from a client. One or more environment characteristics is then determined. At least a portion of a plurality of agent components are dynamically selected based on one of the plurality of patterns, the pattern selected based on the client request and the environment characteristics. Data is then accessed from the database using the selected agent components.

The invention has several important technical advantages. Various embodiments of the invention may have none, some or all of these advantages. The invention allows the extensible agent to be more flexible than traditional software agents. For example, dynamic configuration of agent components may be performed resulting in changes to the agent's processing at run-time, often without programmer modifications to code or administrator intervention.

An additional advantage in particular embodiments may be that the agent is operable to process requests via a web browser, web server, or any other suitable environment. Also, in accordance with some embodiments, the extensible agent system and method can be used to access any data stored in flat files or any type of existing relational database system such as, for example, an Access®, DB2®, or Oracle® database system. Further, the invention allows for components to be reused, resulting in reduced development time, reduced development costs, and faster time to market. Other technical advantages of the present invention will be readily apparent to one skilled in the art.

BRIEF DESCRIPTION OF THE DRAWINGS

For a more complete understanding of the present invention and its advantages, reference is now made to the following descriptions, taken in conjunction with the accompanying drawings, in which:

FIG. 3 is a flowchart illustrating an example method for providing an example extensible agent of FIG. 2;

FIG. 5 illustrates an example method used by the communicator object;

FIG. 6 illustrates an example method used by the transform object; and

DETAILED DESCRIPTION OF EXAMPLE EMBODIMENTS OF THE INVENTION

Figure 1:
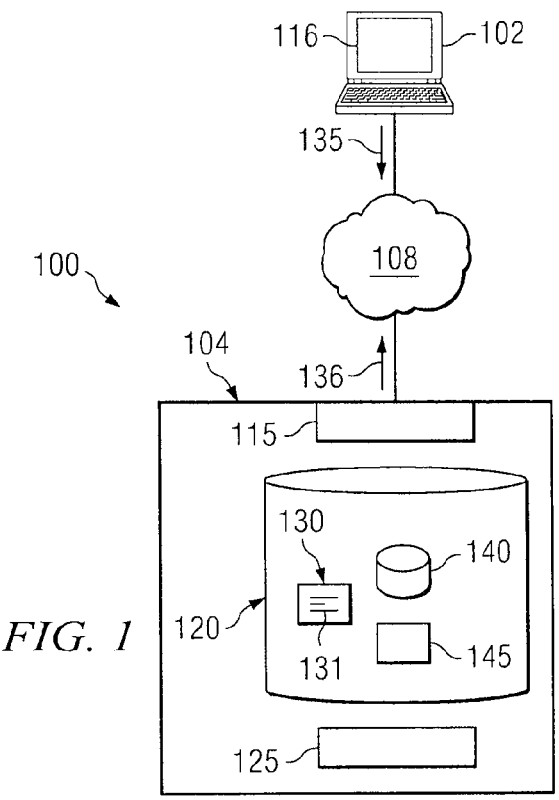
FIG. 1 illustrates one embodiment of a system for providing an extensible agent.

FIG. 1 illustrates one embodiment of a system 100 for providing an extensible agent 130. At a high level, system 100 comprises any computing system that includes extensible agent 130. In general, system 100 is a client-server environment comprising at least one client 102, a server 104, and one or more agents 130, but system 100 may also be a standard computing environment or any other suitable environment. For example, system 100 may comprise a distributed network system that includes one extensible agent 130, where agent 130 is operable to communicate information across the Internet via a web server or to client 102 through a non-web-enabled connection. Generally, agent 130 provides extensibility by automatically retrieving one or more agent components 131 appropriate for the computing environment, client 102, and other suitable criteria. The term "automatically," as used herein, generally means that the appropriate processing is substantially performed by at least part of agent 130. It should be understood that "automatically" further contemplates any suitable user interaction with system 100. In one embodiment, extensible agent 130 may be used in numerous, disparate environments without requiring major changes to source code by a developer, thereby allowing dynamic reconfiguration of agent components 131 during processing of request 135 from client 102.

Each client 102 may include input devices, output devices, mass storage media, processors, memory, interfaces, communication ports, or other appropriate components for communicating client requests 135 to server 104 and viewing the generated output. It will be understood that there may be any number of clients 102 coupled to server 104. As used in this document, client 102 is intended to encompass a personal computer, workstation, network computer, kiosk, wireless data port, personal data assistant (PDA), one or more processors within these or other devices, or any other suitable processing device. Moreover, "client 102" and "user of client 102" may be used interchangeably without departing from the scope of this disclosure. For example, client 102 may comprise a computer that includes an input device, such as a keypad, touch screen, mouse, or other devise that can accept information, and an output device that conveys information associated with the operation of server 104 or clients 102, including digital data or visual information. Both the input device and output device may include fixed or removable storage media such as a magnetic computer disk, CD-ROM, or other suitable media to both receive input from and provide output to users of clients 102 through a graphical user interface (GUI) 116.

GUI 116 comprises a graphical user interface operable to allow the user of client 102 to interface with system 100 and view at least a portion of the output from agent 130. Generally, GUI 116 provides the user of client 102 with an efficient and user-friendly presentation of data provided by system 100. GUI 116 may comprise a plurality of displays having interactive fields, pull-down lists, and buttons operated by the user. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in system 100 and efficiently presents the information to the user. Server 104 can accept data from client 102 via the web browser (e.g., Microsoft Internet Explorer or Netscape Navigator) and return the appropriate HTML or extensible Markup Language (XML) responses.

In one embodiment, client 102 further comprises Response, Session, Config, and Context objects operable to handle web-based or non-web-based environments. In this embodiment, user requests made from GUI 116 or other suitable medium can be encapsulated into wrapper objects that enable processing in any suitable environment. A base object may be used by client 102 to handle messages using Knowledge Query and Manipulation Language (KQML), XML, or other suitable protocols as well as message publishing and subscription.

For example, client 102 may be a web client, such as a "java servlet", as defined by Sun Microsystems for processing web requests. In this example, client 102 gathers form parameters from GUI 116, using the name of the field on the form and the corresponding value from text fields, checkboxes, and the like. Client 102 then provides a request object including a role, or context, of agent 130 using a property, indicating that the client is directly interfacing with the user in a web situation. Client 102 provides a response object that provides a mechanism to provide output to the user. Client 102 may also provide a configuration object that holds data about the run-time environment of client 102. Client 102 may further communicate a context object that holds data about the current run-time environment. This example web client 102 then creates a list of the items and properties. Client 102 sends request 135 to agent 130, where request 135 object includes the sender object, the receiver object, the request itself, and any other information appropriate for agent 130.

Server 104 includes memory 120 and processor 125 and comprises an electronic computing device operable to receive, transmit, process and store data associated with system 100. For example, server 104 may comprise a general-purpose personal computer (PC), a Macintosh, a workstation, a Unix or Linux-based computer, a server computer, or any other suitable device. According to one embodiment, server 104 may comprise a web server. According to another embodiment, server 104 may be a back-end or remote server that acts as a data provider by retrieving data from a software product residing on it in response to a remote request. In short, server 104 may comprise software and/or hardware in any combination or environment suitable to receive a request 135 from client 102, directly or indirectly, and process request 135 using the appropriate agent components 131.

FIG. 1 provides only one example of computers that may be used with the disclosure. For example, although FIG. 1 provides one example of server 104 that may be used with the disclosure, system 100 can be implemented using computers other than servers, as well as a server pool. The present disclosure contemplates computers other than general purpose computers as well as computers without conventional operating systems. As used in this document, the term "computer" is intended to encompass a personal computer, workstation, network computer, or any other suitable processing device. Computer server 104 may be adapted to execute any operating system including UNIX, Linux, Windows, or any other suitable operating system.

Server 104 includes interface 115 for communicating with other computer systems, such as client 102 or another server, over network 108 in a client-server or other distributed environment. In certain embodiments, server 104 receives request 135 from network 108. Network 108 facilitates wireless or wireline communication between server 104 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs) radio access networks (RANs), metropolitan area networks (MANs), wide area networks (WANs), all or a portion of the global computer network known as the Internet, and/or any other communication system or systems at one or more locations. Generally, interface 115 comprises logic encoded in software and/or hardware in a suitable combination and operable to communicate with network 108. More specifically, interface 115 may comprise software supporting one or more communications protocols associated with communications network 108 or hardware operable to communicate physical signals.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, memory 120 includes at least one agent 130 and its constituent agent components 131, database 140, and knowledgebase 145, but may also include any other appropriate data.

In the embodiment illustrated, server 104 includes one extensible agent 130 that processes one or more requests 135 communicated via network 108. Generally, agent 130 receives requests or commands from any remote computer or other agent and retrieves data from database 140. Once the data has been gathered, agent 130 may communicate the data to client 102 or client 102 may retrieve the data from agent 130, as appropriate. Extensible agent 130 could include any hardware, software, firmware, or combination thereof operable to receive a client request 135 from client 102, retrieve data from memory 120 in a suitable format, and process the retrieved data as appropriate, and communicate the processed data to client 102. Agent 130 may be written in any appropriate computer language such as, for example, C, C++, Java, Visual Basic, and others. It will be understood that while agent 130 is illustrated as a single multi-tasked module, the features and functionality performed by this engine are normally performed by one or more of a plurality of agent components 131 (as illustrated in more detail in FIG. 2) such as, for example, a ServiceLocator object, a Communicator object, and a Perceptor object.

Database 140 comprises any storage media for the storage and retrieval of information. According to one embodiment, database 140 may comprise a relational database normally accessed through Structured Query Language (SQL) statements. Relational databases use sets of schemas to describe the tables, columns, and relationships in the tables using basic principles known in the field of database design. In another embodiment, database 140 may comprise XML documents, flat files, or comma-separated-value (CSV) files.

Knowledgebase 145 comprises any datastore used by system 100 to, at least partially, determine and implement the appropriate properties and actions of agent 130 and its agent components 131. For example, as illustrated in more detail in FIG. 7, knowledgebase 145 may comprise an action table and a properties table. Generally, knowledgebase 145 provides at least a portion of the information employed by agent 130 to select the appropriate components 131. For ease of understanding, the set or grouping of selected components 131 may be termed a "component selection pattern" to be used for one or more particular tasks. Each example component selection pattern is a description of communicating components 131 that may be customized to solve a general problem in a particular context. Moreover, each component selection pattern may include one or more components 131 that use one or more design patterns as depicted in the following table. These design patterns may be used to provide system 100 with the ability to share and reuse successful solutions.

| Example Design Patterns: | Example Agent Components 131: | | | | | | | | | | | | |
|---|---|---|---|---|---|---|---|---|---|---|---|---|---|
| | Agent | Commun | SvcLoc | Percep | Reques | Plan | Model | Exec | Data | Dao | Transf | Persis | Mobil | Effect |
| 1. Abstract Factory- Create families of related objects | | | X | | | | | | | | | | | |
| 2. Adapter - Convert interfaces using adapter or wrapper | | X | | X | | X | X | X | | X | X | X | X | X |
| 3. Aggregate Entity- Manage tree of related, persistent objects | | | | | | | | X | | | | | | |
| 4. Blackboard - Objects work together to share knowledge | | | | | | | X | X | | | | | | |
| 5. Bridge - Decouple abstraction from its implementation | | | | | | | | X | | | | | | |
| 6. Builder - Use same construction process for multiple objects | | | | | | | | | | | X | | | |
| 7. Business Delegate- Hide logic implementation details | | | | | | | | X | | | | | | |
| 8. Cache Management- Keep objects for later use | | | X | | | | X | | | | | | | |
| 9. Chain of Responsibility - Decouple senders and receivers | | | | | | | | X | | | | | | |
| 10. Changeable Roles- Dynamically vary an object's role | X | X | | X | | X | X | X | X | X | X | X | X | X |
| 11. Command - Parameterize requests as objects | | | | | X | X | | | | | | | | |
| 12. Command Processor-Request separated from execution | | | | | X | | | X | | | | | | |
| 13. Composite - Tree structures for uniformity, less complexity | | | | | | | | X | | | | | | |
| 14. Composite View- Aggregates common presentation logic | | | | | | | | | | | | | | X |
| 15. Container - Supervisor object manages group of objects | | | | | | | | X | | | | | | |
| 16. Container - Decouple event sources and handlers | X | | | | | | | X | | | | | | |

-continued

| | Example Agent Components 131: | | | | | | | | | | | | | |
|---|---|---|---|---|---|---|---|---|---|---|---|---|---|---|
| Example Design Patterns: | Agent | Commun | SvcLoc | Percep | Reques | Plan | Model | Exec | Data | Dao | Transf | Persis | Mobil | Effect |
| 17. Data Access Object - Entity object handles sql and access | | | | | | | | | | X | | | | |
| 18. Decorating Filter - Add filters with no code changes | X | | | | | X | | | | | | | | |
| 19. Decorator - Dynamically add responsibilities to an object | | | | | | | | | | | | X | | |
| 20. Delegation - Object performs actions for another object | X | | | X | | | | X | X | X | | | | |
| 21. Dispatcher View - Handle dynamic outputs, manage views | | | | | | | | | | | | | | X |
| 22. Facade - Unified, simple interface to hide complexity | X | | | | | | | X | | | | X | | |
| 23. Factory Method - Defer installation to sub-classes | | | X | | | | | | | | | | | |
| 24. Front Controller - Central object initially handles request | X | | | | | | | | | | | | | |
| 25. Interface - Separate definition and its implementation | X | X | X | X | X | X | X | X | X | X | X | X | X | X |
| 26. Item Description - Define, describe variables elsewhere | | | | | | | | | X | | | | | |
| 27. Iterator - Aggregate object access, but hide implementation | X | | | | | | X | | | | | | | |
| 28. Lazy Initialization - Delay object creation until needed | X | | | | | | | | | | | X | | |
| 29. Lookup Table - Lookup data once, save memory and time | | | | | | | X | | | | | | | |
| 30. Marker Interface - Decalre capabilities without methods | X | X | X | X | X | X | X | X | X | X | X | X | X | X |
| 31. Mediator - Hide and simplify how objects interact | | | | | | | | X | | | | X | | |
| 32. Memento - Capture and externalize an object's state | | | | | | | | X | | | | | | |
| 33. Microkernel - Separate core and extended functionality | | | | | | | | X | | X | | | | |
| 34. MVC - Use model, view and controller objects | | | | | | | X | X | X | | | | | X |
| 35. Object Pool - Reuse objects that are expensive to create | | | X | | | | | | | | | X | | |
| 36. Observer - Notify objects when an object's state changes | | | | | | | | | X | | | | | |
| 37. Polymorphism - Polymorphic method calls | | X | | | | | | | | | | | | |
| 38. Proxy - Representative controls access to an object | X | | | | | | | X | | | | X | | |
| 39. Reflection - Dynamic changes to structure and behavior | | | | | | | | | | | X | | | |
| 40. Service Activator - Asynchronous requests, messages | | X | X | | | | | | | | | | | |

Example Agent Components 131:

| Example Design Patterns: | Agent | Commun | SvcLoc | Percep | Reques | Plan | Model | Exec | Data | Dao | Transf | Persis | Mobil | Effect |
|---|---|---|---|---|---|---|---|---|---|---|---|---|---|---|
| 41. Service Locator- Handle creation, location of services | | | X | | | | | | | | | | | |
| 42. Service to Worker- Dispatcher prepares dynamic outputs | | | | | | | | | | | | | | X |
| 43. Session Facade- Hide business object complexity | | | | | | | | X | | | | | | |
| 44. Singleton - Ensure one instance with global access to it | X | | | | | | | | | | | X | | |
| 45. Single Threaded Execution - Prevent concurrent access | X | | | | | | | | | | | X | | |
| 46. Snapshot - Maintain object state allowing restoration later | | | | | | | X | | | | | | | |
| 47. State - Change object behavior based upon current context | X | X | X | X | X | X | X | X | X | X | X | X | X | X |
| 48. Strategy - Set of algorithms vary independently of clients | X | X | X | X | X | X | X | X | X | X | X | X | X | X |
| 49. Template - Subclasses refine skeleton implementation | | | | | | | | X | X | | | X | | |
| 50. Value List Handler - List of results handled flexibly | | | | | | | | | | X | | | | |
| 51. Value Object- Encapsulate data passed between tiers | | | | | | | | | | X | | | | |
| 52. Value Object Assembler - Build composite value object | | | | | | | | | | | X | | | |
| 53. View Helper- Delegate content processing to heelpers | | | | | | | | | | | | | | X |

It will be understood that the above list of design patterns are for example purposes only. System 100 may use none, some, all of the example design patterns or other design patterns for any suitable purpose without departing from the scope of this disclosure. Returning to knowledgebase 145, knowledgebase 145 may be of any suitable format including XML documents, flat files, comma-separated-value (CSV) files, SQL tables, relational database tables, and others. Moreover, it will be understood that while illustrated separately, knowledgebase 145 may reside in database 140 without departing from the scope of this disclosure.

Server 104 also includes processor 125. Processor 125 executes instructions and manipulates data to perform the operations of server 104 such as, for example, a central processing unit (CPU), an application specific integrated circuit (ASIC) or a field-programmable gate array (FPGA). Although FIG. 1 illustrates a single processor 125 in server 104, multiple processors 125 may be used according to particular needs, and reference to processor 125 is meant to include multiple processors 125 where applicable.

In one aspect of operation, client 102 communicates a request 135 to server 104. Agent 130 determines various characteristics and parameters of request 135. In certain embodiments, request 135 may provide the requisite characteristics in a request object. Agent 130 then determines the appropriate run-time environment based on request 135. For example, request 135 may require data from both a relational database, such as database 140, and from a remote web-enabled data provider. Based on the various environment and characteristics of request 135, agent 130 locates or instantiates (creates) one or more agent components 131 in order to appropriately process request 135. It will be understood that agent 130 may utilize none, one, or many of the tables in knowledgebase 145 to appropriately determine which components 131 to utilize. After request 135 is suitably processed, agent 130 communicates response 136 to client 102.

Figure 2:
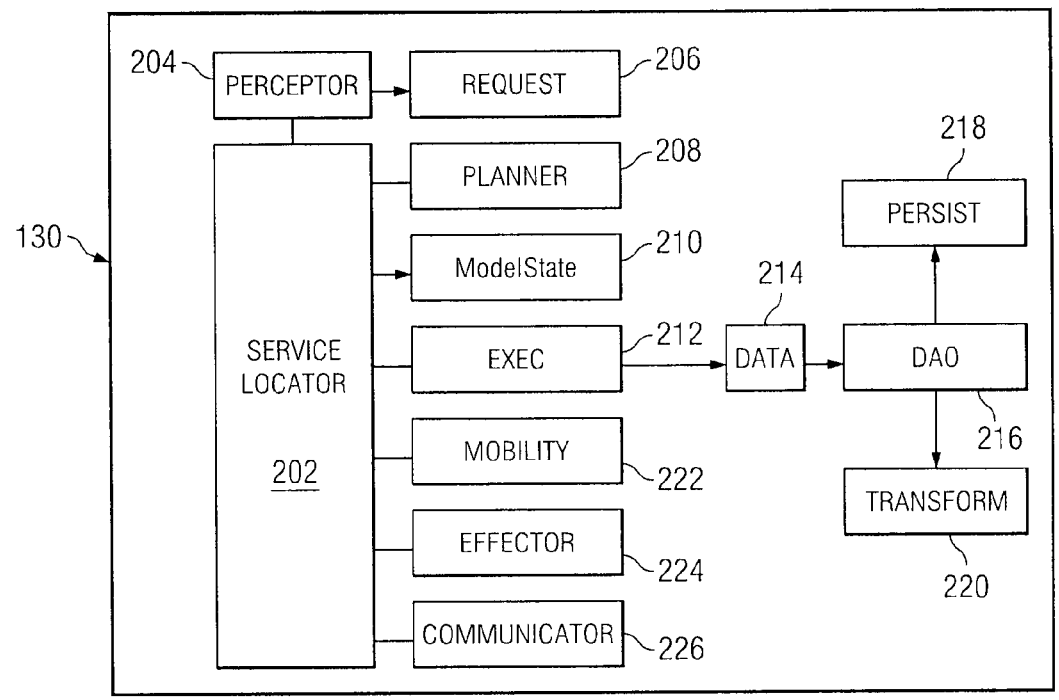
FIG. 2 illustrates an example extensible agent including a plurality of agent components according to one embodiment of the present invention.

FIG. 2 illustrates an extensible agent 130 that includes a plurality of example agent components 131 according to one embodiment of the present invention. Generally, agent 130 uses any number of agent components 131 such that it may process data in a plurality of environments, both web-enabled and non-web-enabled, including, for example, a Java environment. Agent 130 and components 131 may comprise object-oriented programming objects operable to be instantiated as needed. Moreover, agent 130 and its agent components 131 may comply with Foundation for Intelligent Physical Agents (FIPA) standards for interoperability, as currently defined at www.fipa.org to further its reusability and compatibility. Each component 131 may comprise a plurality of sub-components or child classes without departing from the scope of this disclosure. For example, each component 131 may represent a component group of subclasses, each operable to be instantiated a plurality of times. In certain embodiments, agent components 131 comprise at least a subset of the illustrated components, namely ServiceLocator 202, Perceptor 204, Request 206, Planner 208, ModelState 210, Exec 212, DataBean 214, Dao 216, Persist 218, Transform 220, Mobility 222, Effector 224, and Communicator 226. It will be understood that the illustrated agent components 131 are for example purposes only and that agent 130 may include any number of components 131, each comprising any suitable logic.

ServiceLocator 202 is the object for managing the creation or location of other components 131 using properties. For example, properties for creating objects can be handled via a Java properties file or through knowledgebase 145 of properties. Knowledgebase 145 can be changed during run-time allowing agent 130 to dynamically adapt to different situations that arise. ServiceLocator 202 components are operable to create, locate, and pool other components 131 based on interface type and select the most appropriate components 131 for the current task. According to particular embodiments, ServiceLocator 202 may comprise a plurality of ServiceLocator objects, each associated with one interface type. In short, ServiceLocator 202 can be used by agent 130 and other components 131 to create and find appropriate components 131 for processing request 135.

Perceptor 204 gathers user information in various formats as needed for the one or more tasks involved to process request 135. As such, Perceptor 204 can capture information from the requisite environments. For example, in a web-based environment in which a user has provided information in HTML form, Perceptor 204 can capture the user parameters and encapsulate the information in an appropriate RequestBean object. In a second example, in non-web-based environments, ServiceLocator 202 may create or locate Perceptor 204 to handle language translation or to capture a plurality of small screens into one Request 206.

Agent Request 206 encapsulates user information and parameters. This encapsulation may include handling of errors to be provided back to the user or source for handling, and wrapping appropriate input information into RequestBeans, a type of Java bean, for processing. For example, Perceptor 204 may encapsulate user request parameters in an agent RequestBean 206.

Planner 208 obtains requests from agent 130 for actions to be taken, scheduling actions by priority, updating action status, and providing scheduled actions for subsequent processing. In one embodiment, the actions are stored in and retrieved from knowledgebase 145. A set of action Java beans may also be used to specify goals and intended processing. Agent 130 may use Planner 208 to develop a planned set of actions for handling the user's request. The actions provided in the knowledgebase 145 can be selected by Planner 208 as appropriate. Actions can be encapsulated in Command Java beans and may include, for example, the prioritized sequence of execution, the recommended execution of components 131 (such as Exec 212) to satisfy request 135, identification of data to be retrieved from database 140, and identification of any Transform 220 objects for transforming sets of database results to Java beans or Java beans into database values (illustrated in more detail in FIG. 6). Planned actions may also include requests received from other agents. As such, agent 130 is further operable to request agent actions to be executed from Planner 208.

Generally, ModelState 210 acts as a "blackboard" for information needed by multiple components 131. ModelState 210 is available to other components and agents for dynamic assembly of all information needed to satisfy request 135. Information can be saved as name-value pairs, lists, and combinations of various types of information collections. For increased processing speed, caching algorithms can be used to save and provide information used frequently. ModelState 210 may represent the "model" in a model-view-controller (MVC) pattern. Information from a user and information needed to satisfy request 135 is often encapsulated in ModelState 210. In certain embodiments, encapsulating data in ModelState 210 avoids passing parameters from object to object and simplifies the memory management function of agent 130.

Exec 212 functions as a processor of business logic. The planned actions of agent 130 can be executed by Exec 212 as needed to satisfy the request. In certain embodiments, Exec 212 contains at least a portion of the business logic. Exec 212 may include a plurality of sub-classes, such as ExecFaçade and ExecData. For example, the requests may be mediated by the ExecFaçade component, which can hide the underlying complexity of satisfying the request. Exec 212 may also function as a controller.

DataBean 214 is a set of reusable components for information storage and retrieval. DataBean 214 can encapsulate data from database 140 and knowledgebase 145 in Java beans. As such, these DataBean 214 Java beans provide a standard way of accessing attributes via Java reflection. DataBean 214 may also handle data in XML format, CSV format, or any other suitable format. Builder components, within Data 214, may be utilized to assemble Java beans. For example, DataBean 214 may be used to encapsulate a list of Java beans of data retrieved from database 140.

Dao 216 is a module, or set of modules, operable to process SQL and object saving or retrievals. Dao 216 is a Data Access Object that can encapsulate common SQL used to insert, update, delete, and select data from database 140 or knowledgebase 145. Exec 212 can use a plurality of reusable Dao 216 objects to handle persistence functions. As such, a common Dao 216 ancestor can encapsulate common logic for its descendants, such as, for example, building parameter lists for prepared SQL statements and Java beans from database search sets of results.

Persist 218 is operable to handle object and data persistence. Persist 218 can further be used for persistence of Java objects. A proxy object can be used to handle all requests, which allows centralized security and transparent access to a database from any location. A database connection pool can be maintained for increased performance. As such, a database manager component can coordinate transactions, and handle connections, JDBC 2.0 statements, and database search sets of results. Multiple interfaces are provided to allow a broad selection of database vendors and types such as, for example, relational, object, and others, and non-database sources.

In one embodiment, Transform 220 converts data formats and structures as appropriate for system 100 and request 135. For example, Transform 220 can be used to transform Java beans into parameter lists or sets of database search results from a SQL select into Java beans. Metadata can be used with Java reflection mechanisms to minimize the amount of code needed for the transforms, and allow the relatively easy handling of additional types of data.

Mobility 222 manages the migration of the processing and data of agent 130. As such, Mobility 222 can be used to migrate agent 131 to another location in system 100 or another environment altogether. For example, agent 130 may be migrated in order to enable more efficient processing by locating agent 130 nearer to the source of data being retrieved. A Locator object (not shown) may be associated with agent 130 and used to specify the location.

Effector 224 is a module, or set of modules, operable to process outputs from agent 130. Effector 224 handles the selection of an appropriate view for a client, including composite views. View Helper Java beans can be used to create a view. For example, Effector 224 can send output information to a selected Java server page. Communicator 226 can function to handle communications, such as messages between components 131 and with other agents. Such messages can include data, and request, receiver, and sender information. Each component 131 can register its message handling capabilities with Communicator 226.

FIG. 3 is a flowchart illustrating an example method 300 for providing an extensible agent 130 according to one embodiment of the present invention. Method 300 is described in respect to system 100 of FIG. 1 and example agent 130 of FIG. 2. However, any other suitable system may use method 300 to provide any extensible agent 130, with any set of components 131, without departing from the scope of this disclosure.

Generally, method 300 describes server 104 receiving a request 135 from client 102 and processing the request using agent 130, where agent 130 comprises a selected subset of components 131. First, client 102 communicates client request 135 to agent 130 at step 302. As described above, request 135 may comprise an object including the sender object, the receiver object, request 135, and any other information appropriate for agent 130.

After receiving request 135, agent 130 sends a "locate" request message to ServiceLocator 202 at step 304 in order to request that a Perceptor object be found, or created, to perceive the user parameters and request 135 characteristics. The ServiceLocator attempts to locates a Perceptor 204 object in its map. If Perceptor 204 is not found for this type of client 102 and the type of request 135, then the ServiceLocator 202 instantiates a Perceptor 204 object. In one embodiment, ServiceLocator 202 requests a PropertyManager to load and use a set of properties in the form of name-value pairs or key-value tuples (KVT). KVTs are loaded from a property file specified for this Agent. KVTs may also be loaded from knowledgebase 145 using a Property table, which could be used to override any matching entries in the property file. This allows entries in a property file to be changed at run-time via updates to the Property table between executions of this type of request 135. ServiceLocator 202 specifies the key part of the KvT. The key part is made up of the type of Perceptor object that was requested, the environmental properties, and the role of agent 130. ServiceLocator 202 searches through the KVTs for a match on the key in order to retrieve the value of the KVT. ServiceLocator 202 creates the Perceptor 204 object based on the value the selected property KVT. ServiceLocator 202 returns the Perceptor object to Agent 130.

At step 306, agent 130 sends a "process" request message to Perceptor 204 to request that the parameters that were provided by Client 102 be saved in a ModelState 210. Perceptor 204 extracts the parameters that were provided by client 102 from the message's content. For example, the parameter extraction may take each parameter from the list of provided parameters.

Execution proceeds to step 308 in which Perceptor 204 sends a "locate" request message to ServiceLocator 202 to request that a ModelState 210 be found and returned. ServiceLocator 202 attempts to locate ModelState 210 in its map. If ModelState 210 is not found for this type of client 102 and the type of request 135, then ServiceLocator 202 creates, or instantiates, a ModelState 210 object by specifying the key part of the KVT. The key part is made up of the type of ModelState 210 that was requested, the environmental properties, and the role of agent 130. ServiceLocator 202 creates ModelState 210 based on the value part of the selected property KVT that names the class. ServiceLocator 202 returns the ModelState 210 object to Perceptor 204.

At step 310, Perceptor 204 object sends a "put" request message to ModelState 210, via ServiceLocator 202, to request that each of the desired parameters of client 102 be saved in the map of ModelState 210. ModelState 210 locates, and creates if needed, a ModelStateMap object, which often is contained within ModelState 210. Next, at step 312, agent 130 sends a "locate" request message to ServiceLocator 202 to request that a Planner object 208 be found or created. This is for planning the actions to be taken. ServiceLocator 202 attempts to locates an existing Planner 208. If Planner 208 is not found for this type of client and the type of request, then ServiceLocator 202 instantiates a Planner 208 using the value part of a selected property KVT that names the class. ServiceLocator 202 returns the located or created Planner 208 object to agent 130.

Planner 208 then populates an action list at step 314. In certain embodiments, planner 208 first determines if agent 130 has been initialized by checking a static boolean variable. If agent 130 has not been initialized, Planner 208 retrieves system initialization actions and places them in the action list with a parameter of "initSystem" as the user request parameters. For example, Planner 208 may determine if the user session initialization has been completed by requesting ModelState 210 to return the session object for the user. The user session initialization actions are added to the action list to be performed following certain system initialization actions, if any. Planner 208 determines and retrieves the actions from knowledgebase 145 and places them in an action list with the user request parameters. The user actions are added to the action list to be done following system initialization actions, if any, and user session initialization actions, if any.

Processing then proceeds to step 316, where Planner 208 requests ServiceLocator 202 to create a DataBean 214 object. Planner 208 sends a "locate" request message to ServiceLocator 202 to request that DataBean 214 be found, or created, which results in DataBean 214 being returned. This is for getting the actions to be taken. ServiceLocator 202 locates in its map DataBean 214. If DataBean 214 is not found for this type of client and the type of request, then ServiceLocator 202 creates DataBean 214 using the value part of the selected property KVT that names the class. ServiceLocator 202 returns DataBean 214 to the particular Planner 208, which made the request.

Once DataBean 214 is returned to Planner 208 at step 318, Planner 208 requests ServiceLocator 202 to create a DataActionBean object, which is often included within DataBean 214. Planner 208 sends a "locate" request message to ServiceLocator 202 to request that a DataActionBean object be found, or created. In certain embodiments, DataActionBean is used by Planner 208 for getting the actions to be taken. ServiceLocator 202 locates in its map a DataActionBean object. If a DataActionBean object is not found for this type of client and the type of request, then ServiceLocator 202 creates a DataActionBean object. ServiceLocator 202 requests the PropertyManager to load and use a set of properties in the form of name-value pairs (or key-value tuples, KVT). ServiceLocator 202 creates the DataActionBean object using the value part of the selected property KVT that names the class. ServiceLocator 202 returns the DataActionBean object to Planner 208 that made the request. At step 320, Planner 208 places values in the DataActionBean object to specify the user request parameters, the properties to obtain an Exec 212 object used to retrieve data, the properties to obtain an DaoAction object, the properties to obtain an DataActionBean object, the name to save the actions in ModelState 210, and a request to perform a "select" function to obtain the actions.

In order to get the set of actions for the user request, Planner 208 may retrieve an ExecFaçade object, which is a subclass of Exec 212, at step 322. Planner 208 sends a "locate" request message to ServiceLocator 202 to request that an ExecFaçade object be found, or created, which results in an ExecFaçade object being returned. Planner 208 sends a "locate" request message to ServiceLocator 202 to request that a ExecFaçade object be found, or created, which results in a ExecFaçade object being returned. This is for obtaining a list of the actions for planning. ServiceLocator 202 locates in its map a ExecFaçade object. If a ExecFaçade object is not found for this type of client and the type of request, then ServiceLocator 202 creates the ExecFaçade object using the value part of the selected property KVT that names the class. ServiceLocator 202 returns the ExecFaçade object to Planner 208.

Once the ExecFaçade object is located, at step 324 Planner 208 sends an "execute" request message to the ExecFaçade object to request that DataBean 214 (with its associated DataActionBean) be executed, resulting in a list of actions being put into the DataBean 214 and saved in ModelState 210. The ExecFaçade object may process the "execute" request message in any appropriate manner. For example, if the message provides DataBean 214, then the ExecFaçade uses the option to obtain the name of the Exec 212 object, or a subclass of Exec 212, from the DataActionBean. Other options include a list of DataBeans 214 or a string containing the name of Exec 212 to directly execute.

Next, at step 326, the ExecFaçade object retrieves an ExecData object. The ExecFaçade object sends a "locate" request message to ServiceLocator 202 to request that an ExecData object be found, or created, which results in an ExecData object being returned. ServiceLocator 202 locates in its map an ExecData object. If an ExecData object is not found for this type of client and the type of request, then ServiceLocator 202 creates the ExecData object using the value part of the selected property KVT that names the class. ServiceLocator 202 returns the ExecData object to the ExecFaçade object that made the request.

Once ExecData is retrieved, the ExecFaçade object sends an "execute" request message to the ExecData object at step 328, providing the DataBean 214 object to request that the DataBean 214 execute with its associated DataActionBean. ExecFaçade uses ExecData to select the actions from knowledgebase 145. Once the actions are selected, the ExecData object may locate a cache of saved data, if any, to determine if the data has been already cached.

Accordingly at step 330, the ExecData object sends a "locate" request message to ServiceLocator 202 to request that a ModelCache object (an example subclass of ModelState 210) be found, or created, and returned. ServiceLocator 202 locates in its map a ModelCache object. If ModelCache object is not found for this type of client and the type of request, then ServiceLocator 202 creates the ModelCache object using the value part of the selected property KVT that names the class. ServiceLocator 202 returns the ModelCache object to the ExecData object that made the request. The ModelCache object receives the "get" request to find the data in its cache at step 330. If the data is found at decisional step 334, then processing proceeds to step 352. Otherwise, processing proceeds to step 336. If the data was not found in the cache at step 334, then the ExecData object sends an "execute" request message to DataBean 214 at step 336. The "execute" request message instructs DataBean 214 to execute, along with its associated DataActionBean.

At step 340, DataBean 214 gets a Data Access Object, or Dao 216, which may be used to select actions, to retrieve the set of actions for the client request 135. DataBean 214 communicates a "locate" request message to ServiceLocator 202 to request that a Dao 216 be found, or created, which results in the Dao object being returned. ServiceLocator 202 locates a Dao 216 object in its map, or creates a Dao 216, using the value part of the selected property KVT that names the class, if none was found. ServiceLocator 202 returns Dao 216 to the DataBean object that made the request.

DataBean 214 requests Dao 216 to execute at step 342. For example, DataBean 214 may send an "execute" request message to the Dao 216 object. This example request instructs Dao 216 to execute with its associated DataActionBean to select one or more actions from knowledgebase 145. Dao 216 handles the "execute" request message from the DataBean 214 object. It then uses DataBean 214 to hold the results of the "select" request. Dao 216 extracts the type of action request from the DataActionBean associated with DataBean 214. Dao 216 retrieves one or more Transforms 220 for a select. Dao 216 extracts the desired type of Transforms 220 from the DataBean's associated DataActionBean. Dao 216 uses the type of action request from the DataActionBean associated with DataBean 214 to execute its "doSelect" method. This method builds the select statement to retrieve actions for this agent's role and the user's request. If the action specified values for the SQL statement and parameters, then these would override those values specified in Dao 216 that was dynamically created. Dao 216 gets the SQL statement from a DataActionBean if the SQL is present in a DataActionBean, otherwise it obtains the SQL from an instance of the descendant of the base Dao 216 class.

Also in step 342, any parameters needed for the select are loaded by Dao 216 into a List using the various fields in a DataActionBean such as, for example, ActParmIds (attribute names for the where clause), ActParmTypes (datatypes of the attributes), and ActParmSources (source of the data). Dao 216 creates a new DataBean 214 object which includes the SQL, the parameters list, and a List to hold the objects returned from database 140.

At step 344, Dao 216 then requests ServiceLocator 202 to provide a Persist 218 object that is located for the particular source of the data. In order to get the one or more Persist 218 objects for a select request, Dao 216 sends a "locate" request message to ServiceLocator 202 to request that a Persist object be found, or created. ServiceLocator 202 locates a Persist 218 object in its map, or creates one if none was found. ServiceLocator 202 searches through the KVTs for a match on the key, and gets the value part of the KVT. ServiceLocator 202 creates Persist 218 using the value part of the selected property KVT that names the class. ServiceLocator 202 returns the Persist 218 object to Dao 216 that made the request.

At step 346, Dao 216 obtains Communicator 226, which is used to send the message to a proxy for Persist 218. A Persist proxy may be used in order that it can be a local object used to send the request to a "real" Persist 218, that may be on another machine, or in a different location. Dao 216 sends a "locate" request message to ServiceLocator 202 to request that a Communicator 226 be found, or created. ServiceLocator 202 locates in its map, or creates if none was found, a Communicator 226 object at step 346. ServiceLocator 202 requests the PropertyManager to load and use a set of properties in the form of name-value pairs (or key-value tuples, KVT). ServiceLocator 202 searches through the KVTs for a match on the key, and gets the value part of the KVT. ServiceLocator 202 instantiates the Communicator 226 object using the value part of the selected property KVT that names the class. ServiceLocator 202 returns the Communicator 226 object to the requesting Dao 216.

At step 348, Dao 216 creates a message with the DataBean object as the content, and the KbManagerProxy object as the request receiver, and sends the message to the Communicator for the Persist object for execution of the select. Communicator 226 receives the message with the DataBean object from Dao 216 in order to send the message to the Persist object for execution. Each object that can send and receive messages via Communicator 226 registers their messages when the object is created. This registration normally includes the messages sent and the messages received. Communicator 226 uses the message request value of "select" and matches it to each object in its list of possible receiving objects until it finds a match.

Next, at step 350, the KbManagerProxy object sends the request to Communicator 226 for a Persist 218. Then Communicator 226 may find other Persists 218, in a similar manner including, for example, the Kb object (in one embodiment an object within Persist 218) that manages all the connections and the KbDbJdbc (in one embodiment a second object within Persist 218) that executes the select request against database 140. Persist 218 objects may use standard SQL statement syntax or any other syntax without departing from the scope of this disclosure. As a result of the "select" request at step 348, various rows of data are returned by the persistence mechanism, in this example knowledgebase 145, and the DataBean 214 is populated with a list of the DataActionBean objects that have the data from the rows ands column values retrieved from the database. This population of the DataActionBean may use Transforms 220 without departing from the scope of this disclosure.

To save the DataActionBeans just retrieved from Model-Cache 210 or knowledgebase 145, Dao 216 requests ServiceLocator 202 to locate ModelState 216 at step 352 (as similarly described above in step 308). To save the DataActionBeans just retrieved, at step 354 Dao 216 requests ModelState 210 to "put" these objects, all within one DataBean 214 enclosing object, into its ModelStateMap for future use, similar to step 310. DataBean 214 may contain the results of the action by Persist 218, such as number of rows affected, errors, and exceptions. Execution proceeds to step 356, where agent 130 sends a "locate" request message to ServiceLocator 202 to request that a PlanScheduler object, a subclass of Planner 208, be found, or created, which results in a PlanScheduler 208 object being returned, as similarly described above in step 312.

At step 358, Agent 130 sends a "process" request message, for example, to the PlanScheduler object to request that the plan of actions be scheduled and executed to complete processing of the client request 135. In response to a "process" request message from agent 130 object, a PlanScheduler object checks to see if the type of the object passed in with the message is a DataActionBean. If so, the PlanScheduler would have requested an ExecExecutor to execute the action.

The PlanScheduler requests ServiceLocator 202 to locate/create the DataBean 214 object populated with the actions at step 360. As a result, ServiceLocator 202 returns the DataBean 214 object to the PlanScheduler that made the request. The PlanScheduler extracts and processes the set, or list, of the actions to be taken from the DataBean 214 at step 362. If the set of actions were empty, then this indicates an invalid request and the PlanScheduler creates a DataActionBean for a new action to be taken. This new action is, for example, to get an Effector 224 object to send the user to a home page with an error message that this was an invalid request. If the set of actions is non-empty, then the following is done as long as there are remaining "active" actions. The "active" actions are those that have not been taken and which have an "active" status in their DataActionBean. The PlanScheduler gets all the actions in the list and loops through them one by one to schedule them and execute them.

But if the action that is being looped through has an "active" status, then example PlanScheduler gets Communicator 226 and an ExecExecutor object. The PlanScheduler then uses Communicator 226 to send a message to the ExecExecutor to process, passing the ExecExecutor object the action to be taken. After the PlanScheduler has processed the action, it changes the action's status to "completed" and retrieves the actions again. This secondary retrieval of the actions is often done to handle where the actions were changed by the user/developer or agent 130. For example, processing performed by one or more of the Exec 212 objects that are called by the ExecExecutor may include inserts in database 140, selects from database 140, business logic, and updates to the actions in knowledgebase 145. After all scheduled actions are completed, the agent's processing results are provided to the requesting client 102 object.

The preceding flowchart and accompanying description illustrate only an exemplary method 300 for agent 130 to receive one or more requests 135, dynamically determine the appropriate components 131 to satisfy each request 135, and process request 135 using the determined components 131. However, system 100 contemplates server 104 using any suitable technique for performing these tasks. Thus, many of the steps in this flowchart may take place simultaneously and/or in different orders than as shown. Moreover, server 104 may use methods with additional steps, fewer steps, and/or different steps, so long as the method remain appropriate. Indeed, the above flowchart is for illustrative purposes only and may involve more components 131, and associated processing, than considered necessary for agent 130 to process request 135.

Figure 4:
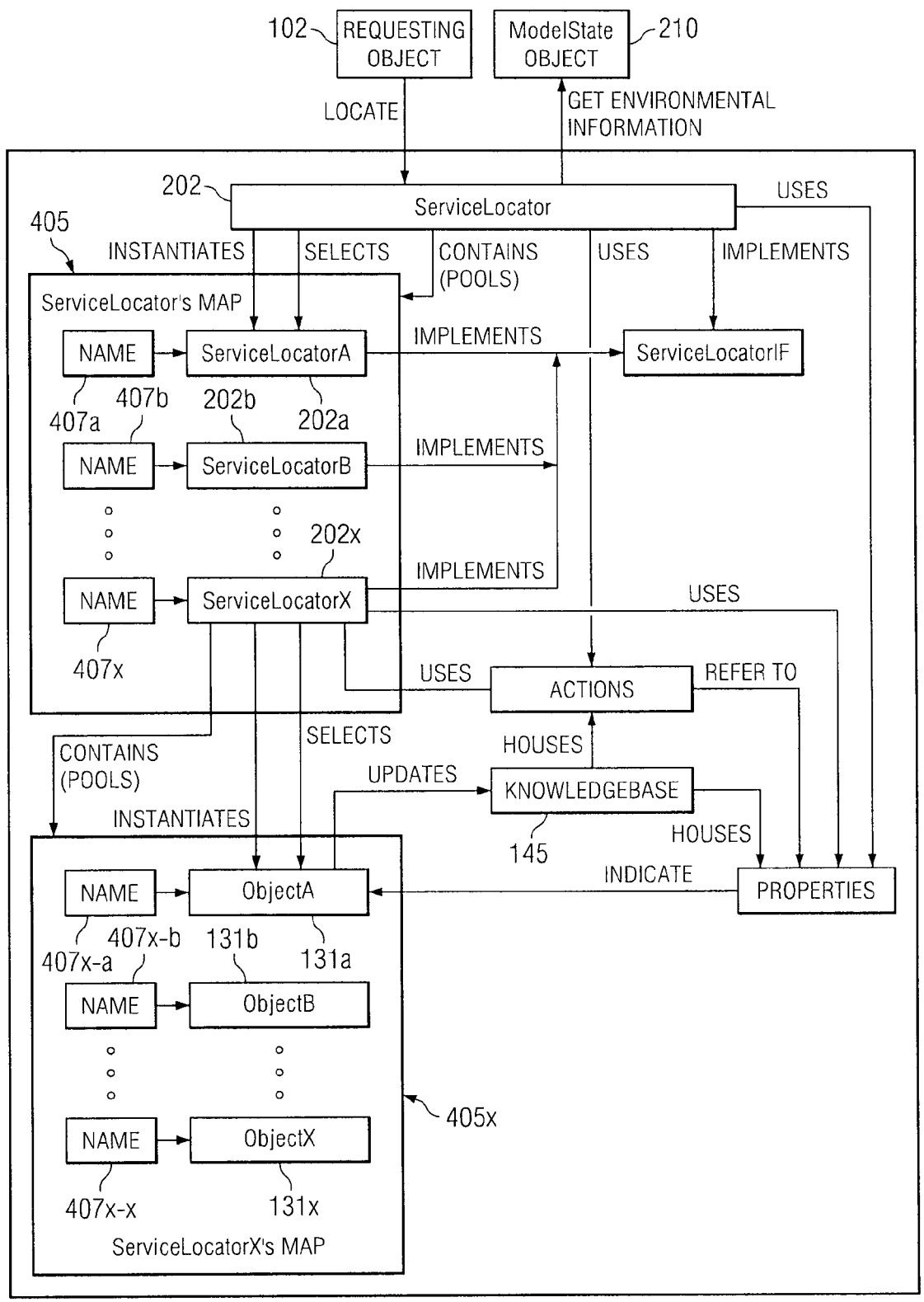
FIG. 4 illustrates one embodiment of a ServiceLocator object in accordance with the example extensible agent of FIG. 2.

FIG. 4 illustrates one embodiment of ServiceLocator 202 in accordance with the example extensible agent 130 of FIG. 2. ServiceLocator 202 include a Map 405. In certain embodiments, each ServiceLocator 202 instantiates, selects, and pools one or more objects based, at least in part, on map 405 of names and associated objects. ServiceLocator 202 also includes one or more child ServiceLocator 202 objects. The illustrated primary ServiceLocator 202 contains multiple ServiceLocator objects, labeled ServiceLocatorA 202a, ServiceLocatorB 202b, and ServiceLocatorX 202x. Each of these child objects represent a unique ServiceLocator 202 object such as, for example, ServiceLocatorCommunicator, which locates and pools Communicator 226 objects. Each child ServiceLocator 202 is associated with a name in the map, such name (407a through 407x) being a combination of the interface type, the environment descriptors, request descriptors, and situational descriptors. For example, ServiceLocatorA may manage a set of Exec 212 objects that satisfy the ExecIF interface, while ServiceLocatorB may manage a set of those Dao 216 objects satisfying the DaoIF interface. Each child ServiceLocator 202 may include a substantially unique map 405, which may include other ServiceLocator 202 objects or agent components 131. In one embodiment of map 405, each object is associated with a name, such as illustrated names 407x-a through 407x-x. In one example, the name may comprise the class name, the environment descriptors, request descriptors, and situational descriptors. In one embodiment, the name is used as a key to select the appropriate component 131 for the appropriate environment, request 135, and other situational characteristics. It will be understood that ServiceLocator 202 may include any number, including none, of child ServiceLocator 202 objects, each for any appropriate interface type, without departing from the scope of this disclosure.

FIG. 5 illustrates an example method 500 used by Communicator 226 according to one embodiment of the present invention. Generally, method 500 illustrates one example of Communicator 226 processing communications, such as messages between other components 131. But system 100 contemplates Communicator 226 using any suitable technique for performing these tasks. Thus, many of the steps in this flowchart may take place simultaneously and/or in different orders than as shown. Moreover, Communicator 226 may use methods with additional steps, fewer steps, and/or different steps, so long as each method remains appropriate.

First each instantiated object, or component 131, registers itself with Communicator 226 at step 502. The requesting object then calls the "register" method in Communicator 226 passing a reference to itself. Communicator 226 saves the reference to component 131 that can send or receive messages within its "messageables" list in step 502. Once component 131 is registered with Communicator 226, messages may easily or more reliably be sent. At step 504, the sending object gets a Communicator 226. For example, the registering component 131 may call a generic "getComm" method to request that ServiceLocator 202 obtain Communicator 226, which implements the CommunicatorIF interface.

To request sending a message, component 131 passes a message object to Communicator 226 at step 506. For example, component 131 may call a "msg" method of Communicator 226. The message object normally contains references for the sender object and a receiver object, each of which may implement a Messageable interface and are registered with Communicator 226.

When Communicator 226 receives the request, it proceeds to send the message at step 508. For example, Communicator 226 finds the name of sending component 131 in its list. Communicator 226 verifies that the sending object's message is contained in that sending object's "getMessagesProduced" list. Communicator 226 then finds the receiving object's name in its list and verifies that the receiving object's message is contained in that receiving object's "getMessagesConsumed" list. If the receiving object's name is not found, Communicator 226 returns a message to the sender indicating an "unknown" message was sent and the returned message's Action-status is set to indicate the failure of the message. If the receiving object is found and the receiver is not agent 130, then Communicator 226 calls the "msg" method, for example, of the receiver to send the message.

Continuing with the example in step 508, if the receiving component 131 is found and is agent 130, Communicator 226 puts the message into a new Payload object. Communicator 226 then selects the Encoding-representation using the properties of agent 130. Communicator 226 may then encode the Payload object, which contains the message, using the Encoding-representation. Communicator 226 puts a Transport-description object into a new Envelope object and, then puts both the Payload object and the Envelope object into a new Transport-message object. Example Communicator 226 then sends the Transport-message object to the receiving agent 130. Communicator 226 calls the "find" method of the AgentFacilitator singleton object, which is an Agent-locator. The Agent-locator locates receiving agent 130 and returns the name of agent 130 to Communicator 226. Communicator 226 then forwards the Transport-message object by calling, for example, the "msg" method of agent 130. When receiving agent 130 returns a Transport-message object in reply to the sender, Communicator 226 extracts the return Message.

Sending component 131 receives a confirmation message from Communicator 226 that the message was received by receiving component 131 at step 510. According to one embodiment, the confirmation message may include an Action-status to indicate the success or failure of the message. When receiving component 131 returns another message, Communicator 226 sends that message back to the sending component 131.

FIG. 6 illustrates an example method 600 used by Transform 220 according to one embodiment of the present invention. Generally, method 600 illustrates one example of agent 130 converting data formats and structures using transform objects 220. But system 100 contemplates Transform 220 using any suitable technique for performing these tasks. Thus, many of the steps in this flowchart may take place simultaneously and/or in different orders than as shown. Moreover, Transform 220 may use methods with additional steps, fewer steps, and/or different steps, so long as each method remains appropriate.

Agent 130 begins processing by determining the type of request 135 at step 602. If request 135 requests information from database 140 (such as a "select" query in SQL), then execution proceeds to steps 604 through 618. In general, these steps retrieve raw data from database 140, get matching metadata from database 140, and transform the raw data into appropriate objects. According to certain embodiments, these objects are returned to the requester in row lists and a column list within each row list, often within a single DataBean 214 object.

At step 604, agent 130 performs the select operation to retrieve the information from database 140, thereby creating a result set of rows and column values. In one embodiment, these results are saved for subsequent use by one or more Transforms 220. Next, at step 606, a builder object is created. For example, agent 130 may get a user-specified property that specifies the class to instantiate for a builder object. The builder class satisfies a BuilderIF interface, at step 608, to provide a method to transform with at least two parameters: a named list of Transform 220 objects and a list of the desired transform operations. The desired builder is used to instantiate Transforms 220, each Transform 220 is then used to transform the saved results from database 140 into objects.

Agent 130 then requests the appropriate builder object to instantiate each of the desired Transforms 220 in the list and put the Transforms 220 in a list of Transform 220 objects at step 610. Agent 130 iterates through each of Transforms 220 in the list, requesting it to transform the data into objects at step 612. Transform 220 gets the information from the metadata of database 140 at step 614. For example, the metadata may include the names of the columns selected, the number of columns, and the datatype of each object. For each row and each column returned, at step 616 Transform 220 creates an appropriate object, such as a String, Timestamp, or Double, based at least in part on the datatype. Then, at step 618, a list of columns within a list of rows is returned to the requesting object with each item in the list of columns comprising an object of the appropriate datatype.

Returning to step 602, if request 135 comprises a request to put, modify, or delete information or objects in database 140 (such as an "insert" into a SQL database), processing proceeds to steps 620 through 640. Generally, these steps extract data from the objects and build parameters for database 140. Often the result of the operation is returned to the requester.

Agent 130 first performs any business operation, such as using an Exec 212 object, that creates a list of one or more objects at step 620. It will be understood that the objects may be of different types to represent different types of data. Normally, each item in the objects is of a datatype compatible with database 140. For example, integers are used in the object to represent data to be stored as an integer in database 145.

Next, at step 622, a builder object is created. For example, agent 130 may get a user-specified property that specifies the class to instantiate for a builder class. The builder class satisfies an interface, at step 624, to provide a method to transform with at least two parameters: a named list of Transform 220 objects and a list of the desired transform operations. The desired builder is used to instantiate Transforms 220, with each Transform 220 used to transform a subset of the saved results from database 140 into objects.

Agent 130 then requests the appropriate builder object to instantiate each of the desired Transforms 220 in the list and put the Transforms 220 in a list of Transform 220 objects at step 626. Agent 130 iterates through each Transform 220 in the list, requesting it to transform the data from objects into datatypes, such as integers suitable for the database 140. Transform 220 gets the appropriate method names from the object class definition at step 630. For example, agent 130 may search for method names that start with the keyword "get". The name of the column is extracted from the method name by getting the string that follows the keyword "get" at 632. The method is then invoked giving an object value at step 634.

Agent 130 then, at step 636, inspects the type of the object to determine a suitable method for extracting the value from the object. This results in a list of column names at step 638. The column names are used to build the "insert" statement without requiring substantial human interaction providing the names or a list of values of the appropriate type for each column used to build the list of parameter values for the database insert. At step 640, each list of column names and values is utilized to perform the update or insert operation. This generates the desired commands to persist the objects without requiring the user of client 102 to specify the operation's desired column names or values.

Figure 7:
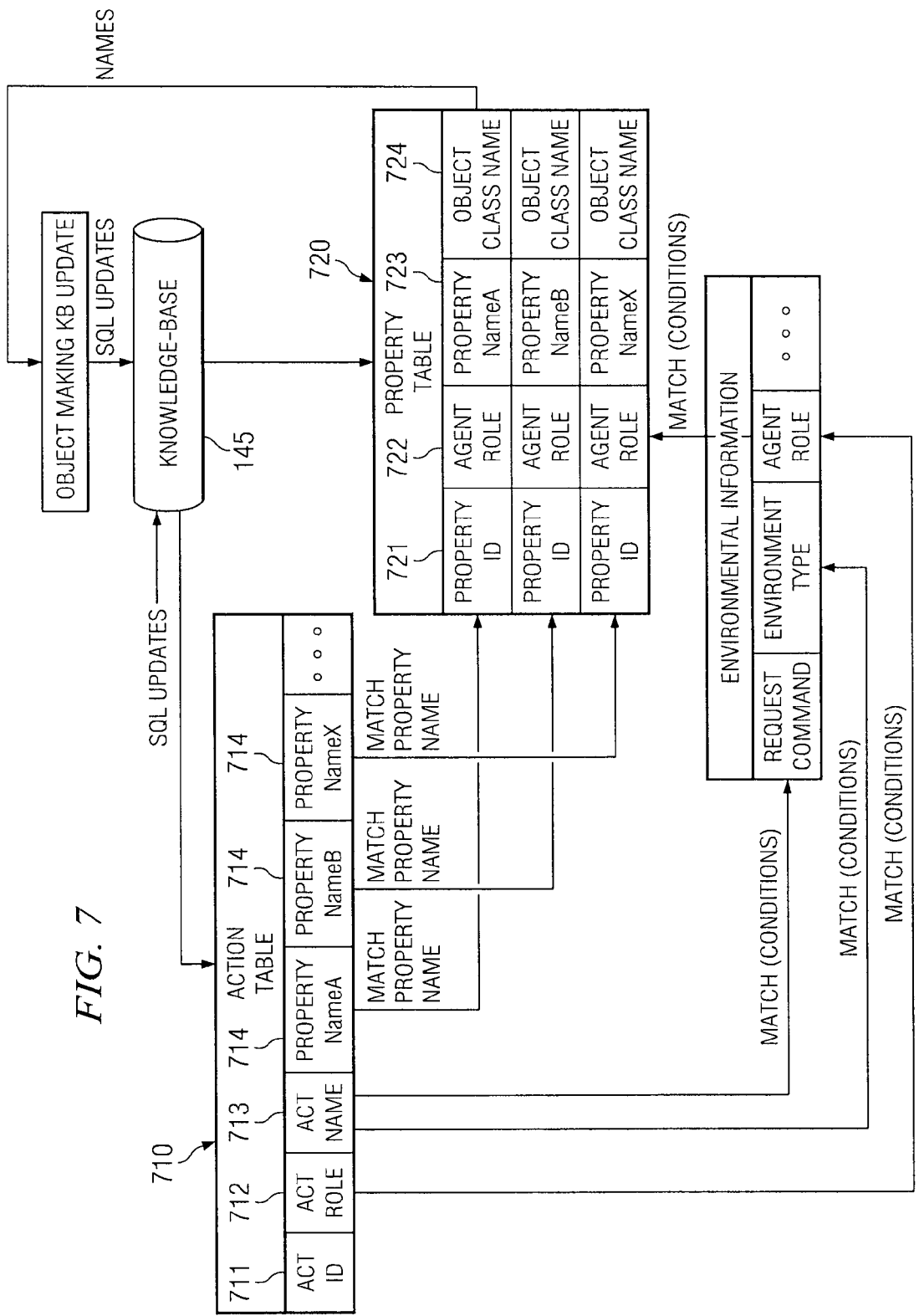
FIG. 7 illustrates one embodiment of the knowledge base data store according to one embodiment of the present invention.

FIG. 7 illustrates one embodiment of knowledgebase 145 according to one embodiment of the present invention. In general, system 100 may use action table 710 to store and process dynamic actions for agent 130. Action table 710 is a multi-dimensional data structure that includes at least one action record. Each action record includes multiple columns. For example, one action record may comprise 76001;"interface";"Update_Your_Profile";" ";101;"perceive"; " ";" ";" ";"GetRequestPersonBean";"GetPerceptor";"PerceptorIF";" ";"RequestBean";"R"; " ";" ";" ";" ";" ";" ";" ";" ";" ";"Active ";" ";"2001-06-18 13:20:00"
In the illustrated embodiment, the action record includes ActId 711, ActRole 712, ActName 713, and a plurality of Property fields 714. ActId 711 is a unique identifier for the action. Each action is identified uniquely with an ActId 711 value that serves as a primary key for the actions in a knowledgebase. Returning to the example record, ActId 711 has a value of 76001. ActRole 712 is the role, or context, of the agent using the action. Different actions may be taken, depending on the role, or context, of agent 130. ActRole 712 may contain a plurality of strings to indicate various combinations of roles, contexts, and situations. This field is used by Planner 208 to select different actions for different context, situations, and roles. Returning to the example record, ActRole 712 has a value of "interface". ActName 713 is the name of the action. The action name provides a grouping for a set of actions that are to done together. Planner 208 can match the action name to the user request information, such as the name of a web page and name of a button. Returning to the example record, ActName 713 has a value of "Update_Your_Profile".

It will be understood that each action record may include none, some, or all of the example columns. Returning to the example action record, action table 710 may include other columns:

ActNameNext: the name of the next action, if any. Planner 208 may use ActNameNext to select the name of the next action that is planned after the current action. The example record has the value " ".

ActSeq: the sequence of the action. Planner 208 can use ActSeq to sequence actions that are to be performed sequentially in priority order. The example record has the value 101.

ActDesc: the description of the action. Exec 212 uses ActDesc to select specific actions, for example, a select from a database or insert of a row to a database. The example record has the value "perceive".

ActInfo: the information concerning the action. The ActInfo specifies additional information about action, such as action used by Effector 224, including the name of the type of output to be used. The example record has the value " ".

ActType: the type of action requested. The ActType specifies the type of action to be done by Dao 216, such as the type of SQL select to be done. The example record has the value " ".

ActSource: the source of data. The ActSource is used to specify the type of database 140 used for the action. The example record has the value " ".

ActBean: specifies the name of the property, which in turn provides the name of the bean being inserted, updated, or deleted. The name of the property is used to obtain the name of the JavaBean that should be created. The example record has the value "GetRequestPersonBean".

ActExec: the name of the property, which in turn provides the name of the service to be used. The name of the property is used to obtain the name of a specific Exec 212, or other object, that should be created and used. The example record has the value "GetPerceptor".

ActExecIF: used to specify the type of object, such as Exec 212, that should be created and used. The example record has the value "PerceptorIF".

ActDao: used to obtain the name of the property that in turn provides the name of Dao 216 that should be created and used. The example record has the value " ".

ActSave: the name used to save the data in ModelState 210 for later use. This name is used, for example, when data is retrieved from database 140 and saved for use by the Agent components 131 or for display. The example record has the value "RequestBean".

ActSaveLoc: the location to save the data for later use. Values indicate the object used to save the data, such as ModelState 210 ("M"), Request 206 ("R") or Session ("S"). The example record has the value "R".

ActCache: indicates "Y" if cache is used, and "U" if cache is updated. When data is requested from database 140, this indicator suggests whether to use any cached data in ModelCache 210. When data is retrieved from database 140, this indicator suggests whether to save the results in a cache in ModelCache 210. The example record has the value " ".

ActSql: the SQL for the data. This can be used to specify the SQL to be used, for example, to override the SQL in Dao 216. The example record has the value " ".

ActParmIds: the parm ids for the action. This is used to specify the attribute names for the "where" clause of a SQL statement in a comma-separated list. The example record has the value " ".

ActParmTypes: the parm types for the action. This is used to specify the datatypes of the attributes for the "where" clause of a SQL statement in a comma-separated list. The example record has the value " ".

ActParmSources: the parm sources for the action. This is used to specify the source of the attribute names for the where clause of a SQL statement in a comma-separated list. Example values are "U" for a parameter that is provided as part of the user's request and "C" for a constant parameter. The example record has the value " ".

ActEvaluator: the name of the property, which in turn provides the name of the evaluator for the action. The name of the property is used to obtain the name of a specific ExecEvaluator object that should be created and used. In one embodiment, an ExecEvaluator is used to provide feedback to Agent 130 on the success or failure of a plan, and to update the plan knowledgebase of actions accordingly. An ExecEvaluator object creates, updates, or deletes actions from knowledgebase 145 based upon feedback, learning, and evaluations to handle changes at run-time. The example record has the value " ".

ActTransforms: the codes for the objects used to transform the data. Transforms 220 are indicated for use by the transform algorithms. The codes are used to indicate properties, which in turn indicate the names of Transform 220 objects to be created and used. The example record has the value " ".

ActDoc: the documentation for the action. This field provides a place for human-readable documentation on the action to facilitate changes by a human to knowledgebase 145. The example record has the value " ".

ActSt: the current status of this action. The various values of the action status include: Active, Executed, and Completed. The action status field is updated by the PlanScheduler to indicate actions that are planned and completed. The example record has the value "Active".

ActUpdtBy: the person/process doing the last update of this action. The example record has the value " ".

ActUpdt: date and time of the last update of this action. The example record has the value "2001-06-18 13:20:00".

It will be understood that the previous action fields are for illustration purposes only and one or more these fields may not be in action table 710 without departing from the scope of this disclosure. Moreover, the example action record is merely to aid understanding and may not represent certain embodiments.

In certain embodiments, knowledgebase 145 may also include properties table 720. Generally, system 100 uses property table 720 to override any matching entries in the Java property file. Property table 720 is a multi-dimensional data structure that includes at least one property record. Each property record includes multiple columns. For example, one property record may comprise:

1000;"interface";"AgentFacilitatorIF";"GetAgentFacilitator";"com.agent.AgentFacilitator";"AgentFacilitator";" ";"Active";" ";"2001-06-18 13:20:00"

In the illustrated embodiment, the property record includes PrpId 721, PrpRole 722, PrpName 723, and PrpValue 724. PrpId 721 is unique identifier for the property. A property is identified uniquely with an PrpId value that serves as a primary key for the properties in knowledgebase 145. Returning to the example record, PrpId 721 has a value of 1000. PrpRole 722 is the role, or context, of agent 130 using the property. Different properties may be used, depending on the role, or context, of agent 130. This field is used to select different properties for different situations and roles. Returning to the example record, PrpRole 722 has a value of "interface". PrpName 723 is the name or key of the property, the first part of a KVT, which is used to select a property value. Returning to the example record, PrpName 723 has a value of "GetAgentFacilitator". PrpValue 724 is the value of the property, the second part of a KVT. For example, this value may name a class to instantiate. The example record has the value "com.agent.AgentFacilitator".

It will be understood that each property record may include none, some, or all of the example columns. Returning to the example property record, property table 720 may include other columns:

PrpType: the type of the property used to select a property value. A value is selected by using a combination of role, type, and name. The example record has the value "AgentFacilitatorIF".

PrpUse: the use of the property for documentation. This field provides a place for human-readable documentation on the action to facilitate changes by a human to knowledgebase 145. The example record has the value "AgentFacilitator".

PrpDesc: the description of the property for documentation. This field provides a place for human-readable documentation on the action to facilitate changes by a human to knowledgebase 145. The example record has the value "AgentFacilitator".

PrpSt: the current status of this property. The various values of the property status include: Active, and Inactive. Only active properties are used. Agent 130, or a user, can update the properties to de-activate a property, or re-activate it. The example record has the value "Active".

PrpUpdtBy: the person or process doing the last update of this property. The example record has the value " ".

PrpUpdt: date and time of the last update of this property. The example record has the value "2001-06-18 13:20:00".

It will be understood that the previous property fields are for illustration purposes only and one or more these fields may not be in property table 720 without departing from the scope of this disclosure. Moreover, the example property record is merely to aid understanding and may not represent certain embodiments.

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶ 6 of 35 U.S.C. §112 as it exists on the date of filing hereof unless "means for" or "step for" are used in the particular claim.

What is claimed is:

1. A method for providing an extensible agent comprising:
   migrating a plurality of agent components to an environment;
   after the migrating, receiving a request from a client;
   selecting one or more characteristics of the client request;
   determining one or more environment characteristics;
   dynamically selecting at least a portion of the plurality of agent components based on the selected one or more characteristics of the client request and the one or more environment characteristics, the at least a portion of the plurality of agent components being selected using a relational knowledgebase that comprises a properties table of properties for dynamic agent component selection and an actions table of actions for processing; and
automatically processing the client request using the selected agent components and according to one or more actions of the actions table that are planned and scheduled.

2. The method of claim 1, each agent component comprising an object defined in an object-oriented programming language.

3. The method of claim 2, further comprising instantiating the selected agent components.

4. The method of claim 3, further comprising registering each instantiated agent component.

5. The method of claim 2, at least a portion of the plurality of agent components comprising objects based on a common parent class, the common parent class comprising component messaging logic and component locating logic.

6. The method of claim 1, further comprising storing the selected one or more characteristics of the client request in one of the selected agent components.

7. The method of claim 1, the client comprising a remote client and the client request is received through a web server.

8. The method of claim 7, further comprising communicating a web-enabled message to the remote client based on the processed request.

9. The method of claim 1, wherein at least a portion of the plurality of agent components comply with Foundation for Intelligent Physical Agents (FIPA) standards.

10. The method of claim 1, wherein dynamically selecting the at least a portion of the plurality of agent components based on the selected one or more characteristics of the client request and the one or more environment characteristics comprises:
automatically retrieving variable properties from a knowledgebase using the selected one or more characteristics of the client request and the one or more environment characteristics; and
selecting the at least a portion of the plurality of agent components based on the retrieved variable properties.

11. The method of claim 1, wherein dynamically selecting the at least a portion of the plurality of agent components based on the selected one or more characteristics of the client request and the one or more environment characteristics comprises selecting the at least a portion of the plurality of agent components based on a JAVA properties file.

12. The method of claim 1, the selected portion of the plurality of agent components operable to be executed in a non-web-enabled environment and a web-enabled environment.

13. A method for providing an extensible agent comprising:
receiving a request from a client;
selecting one or more characteristics of the client request;
determining one or more environment characteristics;
dynamically selecting at least a portion of a plurality of agent components based on the selected one or more characteristics of the client request and the one or more environment characteristics, the at least a portion of the plurality of agent components being selected using a relational knowledgebase that comprises a properties table of properties for dynamic agent component selection and an actions table of actions for processing;
processing the client request using the selected agent components and according to one or more actions of the actions table that are planned and scheduled; and
storing the selected one or more characteristics of the client request in one of the selected agent components, one of the selected agent components comprising an object to process a structured query language (SQL) statement operable to query a database.

14. Software for providing an extensible agent, the software being embodied in a non-transitory computer-readable medium and when executed operable to:
migrate a plurality of agent components to an environment;
after the migrating, receive a request from a client;
select one or more characteristics of the client request;
determine one or more environment characteristics;
dynamically select at least a portion of the plurality of agent components based on the selected one or more characteristics of the client request and the one or more environment characteristics, the at least a portion of the plurality of agent components being selected using a relational knowledgebase that comprises a properties table of properties for dynamic agent component selection and an actions table of actions for processing; and
automatically process the client request using the selected agent components and according to one or more actions of the actions table that are planned and scheduled.

15. The software of claim 14, each agent component comprising an object defined in an object-oriented programming language.

16. The software of claim 15, further operable to instantiate the selected agent components.

17. The software of claim 16, further operable to register each instantiated agent component.

18. The software of claim 15, at least a portion of the plurality of agent components comprising objects based on a common parent class, the common parent class comprising component messaging and component location logic.

19. The software of claim 14, further operable to store the selected one or more characteristics of the client request in one of the selected agent components.

20. The software of claim 19, one of the selected agent components comprising an object to process a structured query language (SQL) statement operable to query a database.

21. The software of claim 14, the client comprising a remote client and wherein the client request is received through a web server.

22. The software of claim 21, further operable to communicate a web-enabled message to the remote client based on the processed request.

23. The software of claim 14, wherein at least a portion of the plurality of agent components comply with Foundation for Intelligent Physical Agents (FIPA) standards.

24. The software of claim 14, wherein dynamically selecting the at least a portion of the plurality of agent components based on the selected one or more characteristics of the client request and the one or more environment characteristics comprises:
retrieving variable properties from a knowledgebase using the selected one or more characteristics of the client request and the one or more environment characteristics; and
selecting the at least a portion of the plurality of agent components based on the retrieved variable properties.

25. The software of claim 14, wherein dynamically selecting the at least a portion of the plurality of agent components based on the selected one or more characteristics of the client request and the one or more environment characteristics comprises selecting the at least a portion of the plurality of agent components based on a JAVA properties file.

26. The software of claim 14, the selected portion of the plurality of agent components operable to be executed in a non-web-enabled environment and a web-enabled environment.

27. A server comprising:
   a memory operable to store a database and a knowledgebase, the knowledgebase comprising a plurality of component selection patterns; and
   one or more processors collectively operable to:
      migrate a plurality of agent components to an environment;
      after the migrating, receive a request from a client;
      select one or more characteristics of the client request;
      determine one or more environment characteristics;
      dynamically select at least a portion of the plurality of agent components based on one of the plurality of component selection patterns, the pattern selected based on the selected one or more characteristics of the client request and the one or more environment characteristics, the at least a portion of the plurality of agent components being selected using the knowledgebase that comprises a properties table of properties for dynamic agent component selection and an actions table of actions for processing; and
      automatically access data in the database using the selected agent components and according to one or more actions of the actions table that are planned and scheduled.

28. The server of claim 27, each agent component comprising an object defined in an object-oriented programming language.

29. The server of claim 28, the one or more processors further operable to instantiate the selected agent components.

30. The server of claim 29, the one or more processors further operable to register each instantiated agent component.

31. The server of claim 28, at least a portion of the plurality of agent components comprising objects based on a common parent class, the common parent class comprising component messaging and component location logic.

32. The server of claim 27, the one or more processors further operable to store the selected one or more characteristics of the client request in one of the selected agent components.

33. The server of claim 32, wherein accessing data in the database using the selected agent components is performed by one of the selected agent components comprising an object to process a structured query language (SQL) statement.

34. The server of claim 27, the client comprising a remote client and wherein the client request is received through a web server.

35. The server of claim 34, the one or more processors further operable to communicate a web-enabled message to the remote client based on the processed request.

36. The server of claim 27, wherein at least a portion of the plurality of agent components comply with Foundation for Intelligent Physical Agents (FIPA) standards.

37. The server of claim 27, wherein dynamically selecting the at least a portion of the plurality of agent components based on the selected one or more characteristics of the client request and the one or more environment characteristics comprises:
   retrieving variable properties from the knowledgebase using the selected one or more characteristics of the client request and the one or more environment variables;
   selecting one of the component selection patterns based on the retrieved variable properties; and
   selecting the at least a portion of the plurality of agent components using the component selection pattern.

38. The server of claim 27, wherein dynamically selecting the at least a portion of the plurality of agent components based on the selected one or more characteristics of the client request and the one or more environment characteristics comprises selecting the at least a portion of the plurality of agent components based on a JAVA properties file.

39. The server of claim 27, the selected portion of the plurality of agent components operable to be executed in a non-web-enabled environment and a web-enabled environment.

* * * * *